United States Patent
Gao et al.

(10) Patent No.: US 10,064,230 B2
(45) Date of Patent: Aug. 28, 2018

(54) METHODS AND DEVICES ENABLING RESOURCE SHARING FOR DEVICE-TO-DEVICE COMMUNICATION IN UNLICENSED BAND

(75) Inventors: Chunyan Gao, Beijing (CN); Wei Bai, Beijing (CN); Haiming Wang, Beijing (CN); Wei Hong, Beijing (CN); Na Wei, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 642 days.

(21) Appl. No.: 14/361,738

(22) PCT Filed: Dec. 1, 2011

(86) PCT No.: PCT/CN2011/083310
§ 371 (c)(1),
(2), (4) Date: Jun. 5, 2014

(87) PCT Pub. No.: WO2013/078663
PCT Pub. Date: Jun. 6, 2013

(65) Prior Publication Data
US 2014/0328306 A1 Nov. 6, 2014

(51) Int. Cl.
*H04W 16/14* (2009.01)
*H04W 76/14* (2018.01)
(Continued)

(52) U.S. Cl.
CPC ........... *H04W 76/14* (2018.02); *H04W 16/14* (2013.01); *H04W 28/0205* (2013.01); *H04W 52/0238* (2013.01)

(58) Field of Classification Search
CPC .................................................. H04W 16/14
See application file for complete search history.

(56) References Cited

U.S. PATENT DOCUMENTS 7,269,151 B2 * 9/2007 Diener ................. H04L 1/1664
370/329
7,400,903 B2 * 7/2008 Shoemake ........... H04W 72/02
455/450
(Continued)

FOREIGN PATENT DOCUMENTS

CN          101179821         5/2008

OTHER PUBLICATIONS

RP-110706; 3GPP TSG-RAN #52; Bratislava, Slovakia May 31-Jun. 3, 2011; Qualcomm Incorporated; "On the need for a 3GPP study on LTE Device-to-Device discovery and communication" (2 pages).

*Primary Examiner* — Alpus H Hsu
(74) *Attorney, Agent, or Firm* — Oblon, McClelland, Maier & Neustadt, L.L.P.

(57) ABSTRACT

A device configured to communicate on a first and at least one second band, the first band being reserved for communication using a specific communication standard, the second band being accessible for communication using different communication standards. The device is configured to request communication resources in the second band from a second device using a first type of request to obtain access to the resources in competition with other requests of the first type issued from other devices; allocate the resources in the second band for communication upon receipt of a resource allocation confirmation from the second device; and communicate using at least a part of the allocated resources in the second band conformant to the specific communication standard applied for communication on the first band.

19 Claims, 3 Drawing Sheets

(51) Int. Cl.
*H04W 28/02* (2009.01)
*H04W 52/02* (2009.01)

(56) References Cited

U.S. PATENT DOCUMENTS

| | | | | |
|---|---|---|---|---|
| 7,689,186 | B2 * | 3/2010 | Matoba | H04W 72/087 455/180.1 |
| 7,826,850 | B2 * | 11/2010 | Matoba | H04L 5/0005 455/450 |
| 7,894,371 | B2 * | 2/2011 | Bonta | H04W 74/02 370/254 |
| 8,078,111 | B2 * | 12/2011 | Jovicic | H04B 7/2615 370/254 |
| 8,379,586 | B2 * | 2/2013 | Kasslin | H04W 16/14 370/329 |
| 8,588,803 | B2 * | 11/2013 | Hakola | H04W 72/085 370/310.2 |
| 8,675,605 | B2 * | 3/2014 | Charbit | H04W 72/1205 370/252 |
| 8,731,590 | B2 * | 5/2014 | Hakola | H04W 72/10 370/329 |
| 8,792,900 | B2 * | 7/2014 | Chen | H04W 28/26 455/452.1 |
| 8,873,480 | B2 * | 10/2014 | Ahmadi | H04W 72/1215 370/329 |
| 8,934,909 | B2 * | 1/2015 | Koskela | H04W 28/08 370/395.41 |
| 8,977,276 | B2 * | 3/2015 | Koskela | H04W 76/023 455/450 |
| 8,995,331 | B2 * | 3/2015 | Kazmi | H04L 5/001 370/252 |
| 9,288,793 | B2 * | 3/2016 | Wang | H04W 72/0406 |
| 2006/0168343 | A1 * | 7/2006 | Ma | H04W 52/38 709/245 |
| 2007/0032254 | A1 | 2/2007 | Chen | |
| 2007/0097891 | A1 | 5/2007 | Kitchin | |
| 2008/0214240 | A1 | 9/2008 | Choi et al. | |
| 2011/0228666 | A1 * | 9/2011 | Barbieri | H04W 76/023 370/216 |
| 2014/0112289 | A1 * | 4/2014 | Kim | H04W 16/14 370/329 |
| 2014/0199969 | A1 * | 7/2014 | Johnsson | H04W 56/00 455/411 |
| 2014/0204791 | A1 * | 7/2014 | Teng | H04W 16/14 370/252 |

* cited by examiner

METHODS AND DEVICES ENABLING RESOURCE SHARING FOR DEVICE-TO-DEVICE COMMUNICATION IN UNLICENSED BAND

FIELD OF THE INVENTION

The present invention relates to devices, methods and computer program products in relation to device-to-device communication. In particular, it relates to those devices, methods and computer program products for device-to-device communication in a so-called unlicensed band while sharing the resources of the unlicensed band.

BACKGROUND

Mobile data transmission and data services are constantly making progress. Typically, mobile communication is based on a mobile communication network infrastructure. Such network infrastructure uses network devices (e.g. network transceiver stations such as evolved Node_ B's, eNB's) for enabling communication among terminal devices. Those transceiver stations operate in a specific frequency spectrum specifically assigned to such telecommunication networks. Such assigned frequency spectrum is referred to herein as "licensed" band as it is licensed (reserved) for (exclusive) use by such telecommunication systems. In contrast thereto, "unlicensed" band denotes a band that is not as such assigned for use by the telecommunication infrastructure, but may be used for/by other purposes/communication systems.

With the increasing penetration of such telecommunication services and an increasing number of subscribers and concurrent users of such telecommunication systems, resources (within the licensed band) may often become a bottleneck.

Approaches are therefore being investigated to overcome and alleviate such bottlenecks. One of those approaches is known as device-to-device (D2D) communication, in which devices communicate directly without a network infrastructure being involved.

Currently, device-to-device (D2D) communication is a hot topic which could be used
to improve the resource usage efficiency,
to reduce the power consumption at both network transceiver device (e.g. eNB) and terminal device (e.g. UE) side,
to off load the traffic from the cellular network infrastructure, and also
to possibly enable some new service type in the future.

At least Qualcomm Inc. has proposed a new study item for the D2D communication in 3GPP TSG-RAN #52 plenary meeting, 31 May-3 Jun. 2011 (cf. RP-110706, "On the need for a 3GPP study on LTE device-to-device discovery and communication", Qualcomm Incorporated). Although D2D concepts are not yet agreed in current/currently developed mobile communication standards, it is likely to be supported by communication network operators in the near future.

It should be noted that concepts outlined in connection with the present invention are generally independent of any particular communication standard; rather, they are generally applicable to a variety of compatible standards. In order to properly describe the concept(s), however, for explanatory purposes only and without any intention to limit the applicability of the concept(s) introduced in the specification to a particular standard, those concept(s) are described with reference to an example scenario. As the example scenario, LTE (Long Term Evolution) and/or LTE-A (LTE-Advanced) was chosen for the network infrastructure. Likewise, as examples for direct D2D communication scenarios, WLAN (Wireless Local Area Network) also sometimes referred to as WiFI™, Bluetooth™, Zigbee™, or others are known. At least some terminology used herein can also be found in those standards.

Though LTE/LTE-A operates in general on licensed band, it may also be configured to additionally resort to unlicensed band. Currently, unlicensed band(s) available for use, or under investigation to be used, are the ISM band (Industrial Scientific Medical) and White Space (WS) and/or TV White Space (TVWS).

WLAN/WiFi™ Direct is one technique which can realize the D2D function. However, there are many drawbacks inherent to such approach, such as inefficient resource utilization, as well as a somewhat limited coverage.

Hence, it provides the motivation to introduce LTE D2D as a new feature/functionality to LTE/LTE-A. Some features and advantages had been expected from LTE D2D such as interference being controllable by eNB as well as more efficient resource utilization.

For LTE D2D, the operation in both licensed band and unlicensed band needs to be considered. LTE deployment in unlicensed band had been considered as one potential way to reduce the operating cost in future, to improve the system throughput, to off-load (shift) the traffic from licensed band and thus to improve the spectrum efficiency.

Since there are already some local networks deployed in unlicensed band, e.g., WiFi™, Bluetooth™, and Zigbee™, co-existence with other local networks had been considered when deploying LTE in unlicensed band. Considering the low transmit power requirement and short coverage of communication in the unlicensed band, LTE D2D is a more suitable scheme in unlicensed band than deploying the cellular approach from LTE to the unlicensed band(s).

In unlicensed band, however, there is a predefined channelization. That is, the band is divided into individual channels of predefined channel bandwidth. In order to facilitate the co-existence with other local networks, reusing the current channelization is preferred. However, the predefined channel bandwidth may not be fully utilized by communication of one single D2D pair. This may thus still cause inefficient resource utilization in this case.

On the other hand, for LTE D2D operation in licensed band, an eNB can allocate resources for each D2D pair, or allocate resources for a group of devices based on the traffic, so as to enable an efficient resource utilization.

Such centralized resource allocation method, however, can hardly apply directly to a scenario using an unlicensed band due to the fact that the low transmit power in unlicensed band results in a localized interference status. That is, the interference at eNB side will be different from that at device side. This makes it infeasible to let eNB get the channel and allocate it to devices.

Instead, it is more attractive to let devices detect and get the channel themselves. In this case, however, it needs to be considered how to improve the resource efficiency. Namely, considering that there is a predefined channelization in the unlicensed band, and the bandwidth may be too large for a single D2D pair and for some traffic, and the reservation of unlicensed band has to be accomplished in the unit of channel(s), then this will result in inefficient resource utilization in some case.

Thus, there is still a need to further improve such systems in terms of above outlined aspects for D2D communication on unlicensed band.

SUMMARY

Various aspects of examples of the invention are set out below.

According to a first (device related) aspect of the present invention, there are provided devices at least as follows:

a device, comprising a transceiver module, configured for communication on a first and at least one second band, the first band being reserved for communication using a specific communication standard, the second band being accessible for communication using different communication standards, and a control module, configured to control the transceiver module to receive and to transmit data, and to process received data, wherein the control module is configured to request communication resources in the second band from another device using a first type of request to obtain access to said resources in competition with other requests of said first type issued from other devices, allocate said resources in the second band for communication upon receipt of a resource allocation confirmation from said another device, and to communicate using at least a part of the allocated resources in the second band conformant to the specific communication standard applied for communication on the first band;

a device, comprising a transceiver module, configured for communication on a first and at least one second band, the first band being reserved for communication using a specific communication standard, the second band being accessible for communication using different communication standards, and a control module, configured to control the transceiver module to receive and to transmit data, and to process received data, wherein the control module is configured to detect, originating from another device, an absence of ongoing communication on a channel of the second band, a request of a first type to obtain access to said resources, and a resource allocation confirmation responsive to said request, and an indication of an unused part of resources allocated in said second band to another device, and wherein said control module is configured, responsive to the above detections, to communicate using at least a part of those indicated resources that are allocated to but unused by said another device in the second band conformant to the specific communication standard applied for communication on the first band;

a device, comprising a transceiver module, configured for communication on a first band, the first band being reserved for communication using a specific communication standard, and a control module, configured to control the transceiver module to receive and to transmit data, and to process received data, wherein the control module is configured to broadcast information pertaining to a division of resources in a second band, the second band being accessible for communication using different communication standards, wherein resources in the second band are formed by individual channels, and the broadcasted information indicates a respective configured number of resource units into which each channel is subdivided in bandwidth and predefined positions in terms of bandwidth and time of the resources at which control signaling is to be signaled.

Advantageous further developments are set out below.

According to a second (method related) aspect of the present invention, there are provided methods at least as follows:

a method, comprising configuring a transceiver module for communication on a first and at least one second band, the first band being reserved for communication using a specific communication standard, the second band being accessible for communication using different communication standards, and controlling the transceiver module to receive and to transmit data, and to process received data, wherein the controlling further comprises requesting communication resources in the second band from another device using a first type of request to obtain access to said resources in competition with other requests of said first type issued from other devices, allocating said resources in the second band for communication upon receipt of a resource allocation confirmation from said another device, and communicating using at least a part of the allocated resources in the second band conformant to the specific communication standard applied for communication on the first band;

a method, comprising configuring a transceiver module for communication on a first and at least one second band, the first band being reserved for communication using a specific communication standard, the second band being accessible for communication using different communication standards, and controlling the transceiver module to receive and to transmit data, and to process received data, wherein the controlling further comprises detecting, originating from another device, an absence of ongoing communication on a channel of the second band, a request of a first type to obtain access to said resources, and a resource allocation confirmation responsive to said request, and an indication of an unused part of resources allocated in said second band to another device, and wherein said controlling further comprises, responsive to the above detections, communicating using at least a part of those indicated resources that are allocated to but unused by said another device in the second band conformant to the specific communication standard applied for communication on the first band;

a method, comprising configuring a transceiver module for communication on a first band, the first band being reserved for communication using a specific communication standard, and controlling the transceiver module to receive and to transmit data, and to process received data, wherein the controlling further comprises broadcasting information pertaining to a division of resources in a second band, the second band being accessible for communication using different communication standards, wherein resources in the second band are formed by individual channels, and the broadcasted information indicates a respective configured number of resource units into which each channel is subdivided in bandwidth and predefined positions in terms of bandwidth and time of the resources at which control signaling is to be signaled.

Advantageous further developments are set out below.

According to a third aspect of the present invention, there are provided one or more computer program product(s) comprising computer-executable components which, when the program is run on a computer, are configured to execute the respective methods, as set out/referenced herein before.

The above computer program product may further comprise computer-executable components which, when the program is run on a computer, perform the method aspects mentioned above in connection with the method aspects.

The above computer program product/products may be embodied as a computer-readable storage medium.

Hence, as derivable from the above, a distributed way to improve the resource efficiency is proposed. This proposed way has, at least according to exemplary aspects, the following advantages:

it helps to increase the resource efficiency for D2D in unlicensed band; and it provides dynamic resource sharing based on traffic.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
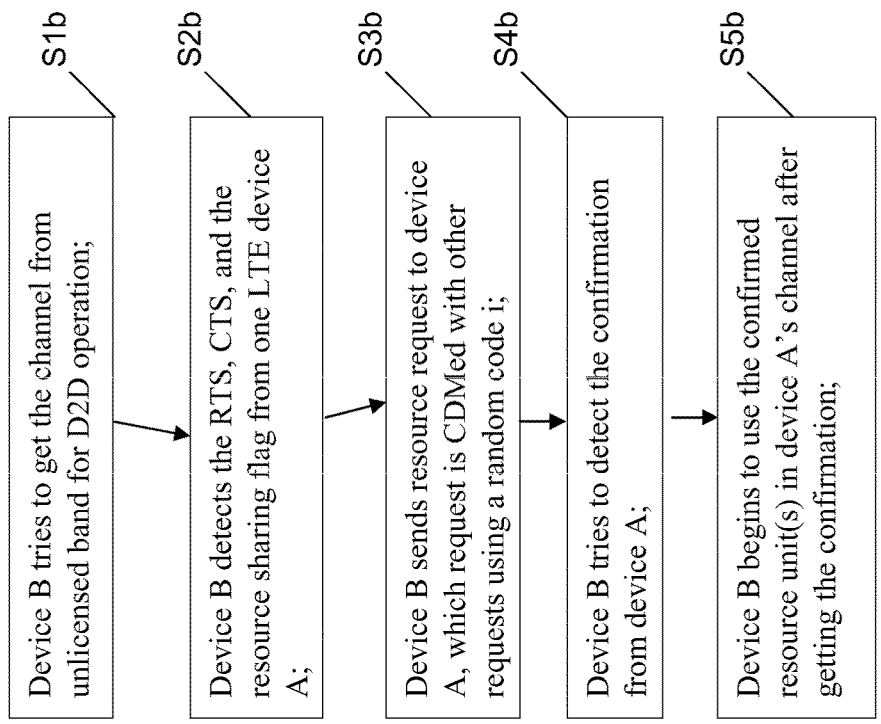
FIG. 1 illustrates in FIGS. 1 (a) and (b) an example of a resource sharing/requesting procedure in an unlicensed band according to a first method (FIG. 1(a), device A) and a second method (FIG. 1(b), device B), respectively.
Figure 1:
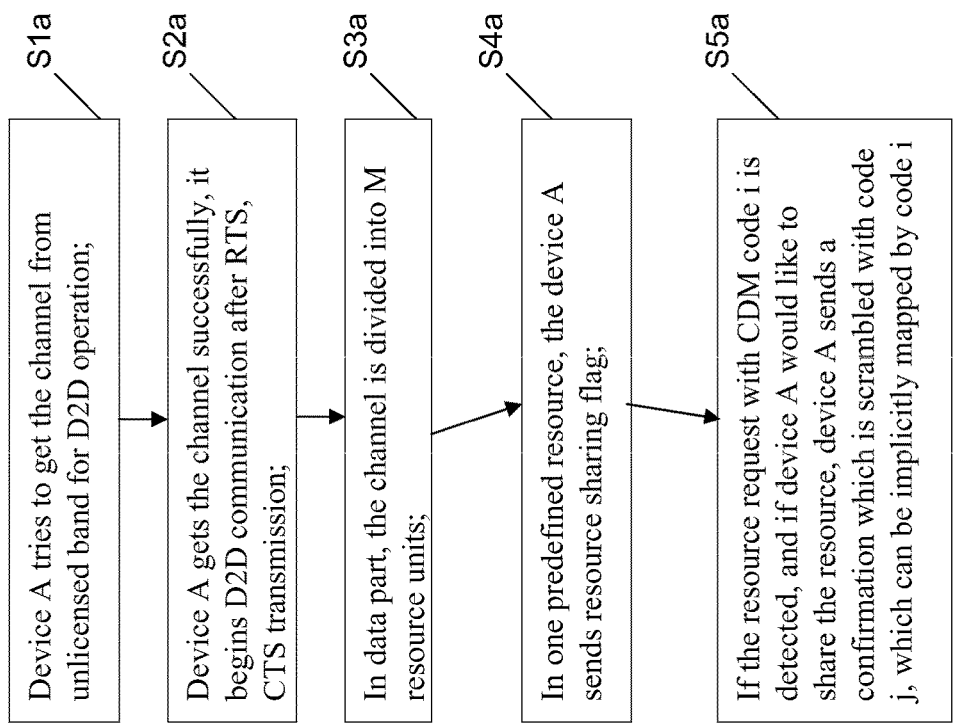

Exemplary aspects of the invention will be described herein below.

Generally, the invention is implemented in an environment of a telecommunication system (e.g. represented by a network transceiver device such as an eNB) operated in a first band, such as for example LTE or LTE-A, which system also supports terminal devices (such as user equipments UE) capable of communicating in dual modes, i.e. via the telecommunication system in a first band, or in a direct mode between terminal devices using at least a second band. This direct mode is also referred to as D2D, device-to-device, in this specification. For such communication on a first and at least one second band, the first band is reserved for communication using the specific communication standard such as LTE/LTE-A, while the second band is accessible for communication using different communication standards. The first band is also referred to as licensed band and the second band is also referred to unlicensed band in this specification.

In this regard, a network transceiver device or network control device, such as an eNB, or the like exerts to a certain extent control over the terminals capable of operating in dual modes, i.e. operate via the (cellular) telecommunication system (insofar representing an LTE device in the example scenario chosen) and operate in the D2D (insofar representing e.g. kind of a WLAN station (or device) in the example scenario chosen) mode.

Insofar, such a network based device comprises, according to at least an exemplary aspect of the invention, a transceiver module configured for communication on a first band, the first band being reserved for communication using a specific communication standard, and a control module, configured to control the transceiver module to receive and to transmit data, and to process received data. Further, the control module is configured to broadcast information pertaining to a division of resources in a second band, the second band being accessible for communication using different communication standards. Those resources in the second band are formed by individual channels. The broadcasted information is indicative of a respective configured number of resource units into which each channel is subdivided in bandwidth. Those resource units may be configured and/or partitioned as physical resource blocks, PRB, similar to those used for communication in the first band. A physical resource block is defined in time-frequency domain by a certain bandwidth and a certain number of symbols transmitted in time over that bandwidth. Typically, at least according to an exemplary aspect in connection with an LTE/LTE-A communication system, the symbols are transmitted as orthogonal frequency division multiplexed symbols, and referred to as OFDM symbols. One or more certain symbols within such a PRB can thus be located at a specific and predetermined position within the time-frequency domain (the grid of symbols over time and frequency/bandwidth portions over the overall frequency range/bandwidth). A respective symbol at such predetermined position can thus also be referred to as a predetermined resource.

Also, information is broadcasted which is indicative of predefined positions (i.e. resources) in terms of bandwidth and time of the resources at which control signaling is to be signaled/received by terminal devices. That is, a position of the signaling in a matrix of OFDM symbols constituting one or more physical resource blocks is indicated. Such control signaling comprises an indication of an unused part of allocated resources, a request for requesting allocation of the indicated unused part of the resources, and a confirmation granting permission to use said resources responsive to such request.

Further, under at least an aspect of the invention, the control module of the network based device is further configured to detect a number of devices present in an area served by the device, and dependent on the detected number, to broadcast a configuration signal to devices that configures the devices to use the control signaling comprising a request for requesting allocation of the indicated unused part of the resources, and the confirmation granting permission to use said resources responsive to such request.

The above will be understood in more detail when referring to the following description of other exemplary aspects of the invention related to the terminal devices capable of operating (also) in a D2D mode (and alternatively as well in an LTE mode).

Namely, to solve the above mentioned problem, basically the following methods/procedures (also possibly implemented in respective computer program products and/or software) and correspondingly configured devices are conceived.

For a dual mode capable device, i.e. a LTE capable terminal device such as a UE which is also D2D capable (and insofar at least similar to a WLAN station or device under control of an access point, AP), there are two methods to obtain resources for communication in an unlicensed band (second band):

the $1^{st}$ method is to compete for a vacant channel, like in WLAN operation, and the $2^{nd}$ method is to request resources from another (terminal) device which had already obtained the channel.

A (dual mode capable) device can be configured to get the resources via method I, or method II, or via both methods.

After one transmission in resources obtained via the $1^{st}$ method, a backoff timer of the device is reset. On the other hand, after one transmission in resources obtained via the 2$^{nd}$ method, the backoff timer of the device is not reset, but instead, the backoff timer is kept unchanged (i.e. stopped) or continued to be counted down. A backoff timer denotes a countdown timer used to determine a timing for resending a request to gain access to resources, and is substantially as introduced in relation to gaining WLAN access.

In the following description of aspects of the invention, a terminal denoted as terminal or device A is used to describe the first method, while a terminal denoted as terminal or device B (in cooperation with a terminal A) is used to describe the second method. As a result, a D2D communication between paired devices A-A' and B-B' is established.

FIG. 1 illustrates in FIGS. 1 (a) and (b) an example of a resource sharing/requesting procedure in an unlicensed band according to a first method (FIG. 1(a), device A) and a second method (FIG. 1(b), device B), respectively.

FIG. 1 illustrates the procedures of resource sharing in unlicensed band. The left block diagram is the operation procedure of device A which would like to share resource with others. In the right block diagram, device B requests resource sharing from device A which already got a channel in unlicensed band, and starts to use it (for D2D communication with device B' (not shown)) after detecting the confirmation from device A.

It is to be noted that the data transmission during D2D and the signaling exchange for resource sharing are in LTE format (conformant to the LTE standards or any other standard applied by the cellular system in connection with the dual mode capable terminal devices), although before that RTS/CTS (Request To Send/Clear To Send) in WLAN format can be sent before data transmission. In the data part, the channel is pre-divided into several resource units, and it is a common division configured by the eNB and known to all LTE D2D devices. In one embodiment the one resource unit can be in same size as the PRB in licensed band. Other sizes of a resource unit as an integer or non-integer multiple of a PRB can be possible for other embodiments. The term "multiple" may imply a value of greater than one but may also denote a value of smaller than one. In such case, a resource unit could be smaller than (i.e. only a fraction of) a PRB.

In relation to device A and a first method to get access to the second (i.e. unlicensed) band, according to aspects of the present invention, device A comprises a transceiver module, configured for communication on a first and at least one second band, the first band being reserved for communication using a specific communication standard, the second band being accessible for communication using different communication standards, and a control module, configured to control the transceiver module to receive and to transmit data, and to process received data. The control module is configured to request communication resources in the second band from another device using a first type of request (RTS) to obtain access to said resources in competition with other requests of said first type issued from other devices, and to allocate said resources in the second band for communication upon receipt of a resource allocation confirmation (CTS) from said another device, and to communicate using at least a part of the allocated resources in the second band conformant to the specific communication standard (LTE) applied for communication on the first band.

Furthermore, the control module is configured to compose the request for communication resources of the first type and to receive the resource allocation confirmation in a format compliant with a carrier sense multiple access method such as RTS/CTS under WLAN. The allocated resources in the second band are allocated as a configured number of resource units (e.g. a number of PRBs) forming a channel within the second band, and the control module is configured to communicate using at least one of said resource units.

The control module is further configured to decide that at least a part of allocated resources are not used by the device, and to indicate the unused part of allocated resources to other devices. In this context, the control module is configured to indicate the unused part of allocated resources by sending a corresponding indication in a predefined position in terms of bandwidth and time of the unused part of the allocated resources.

Furthermore, under another aspect, the control module is configured to receive a request from another device requesting allocation of the indicated unused part of the resources, wherein said request is received in a predefined position (resource) in terms of bandwidth and time of the resources allocated to but unused by said device. Also, the control module is configured to decide on resource allocation of requested resources and correspondingly to transmit a confirmation to said another device so as to grant permission to said another device to use said resources.

Further, the control module is configured to, in case the received request was encoded, apply a coding to the confirmation so as to allow allocation of the confirmation to a specific device that sent the request, wherein the coding applied to the confirmation is mapped to the coding used for said request.

In relation to device B and a second method to get access to the second (i.e. unlicensed) band, according to aspects of the present invention, device B comprises a transceiver module, configured for communication on a first and at least one second band, the first band being reserved for communication using a specific communication standard, the second band being accessible for communication using different communication standards, and a control module, configured to control the transceiver module to receive and to transmit data, and to process received data. The control module is configured to detect, originating from another device, an absence of ongoing communication on a channel of the second band, a request (RTS) of a first type to obtain access to said resources, and a resource allocation confirmation (CTS) responsive to said request, and an indication of an unused part of resources allocated in said second band to another device. Said control module is configured, responsive to the above detections, to communicate using at least a part of those indicated resources that are allocated to but unused by said another device in the second band conformant to the specific communication standard (LTE) applied for communication on the first band.

The control module is further configured to, responsive to the detection of the indication of an unused part of resources allocated in said second band to another device, transmit a request to said another device requesting allocation of the indicated unused part of the resources. In this context, the control module is further configured to transmit said request in a predefined position (resource) in terms of bandwidth and time of the resources allocated to but unused by said another device. (But still within the resources constituting the channel allocated to the another device.)

The control module is further configured to apply a coding to the request so as to allow allocation of the request to a specific device that sent the request, and the control module is further configured to receive a confirmation from said another device granting permission to said device to used said resources.

Likewise, the control module is configured to, in case the received confirmation was encoded, decode the confirmation so as to allow allocation of the confirmation to a specific device that sent the request, wherein the coding applied to the confirmation is mapped to a coding used for said request.

With particular reference to the Figures, it becomes apparent that in case the device A, which got the channel, will not use all the bandwidth, it can indicate in the resource sharing flag that some resource units are still free. The flag is sent in a predefined resource, e.g. the central N PRB's (constituting the allocated channel) in e.g. the $1^{st}$ OFDM symbol of the data part. All LTE devices which would like to get resource in unlicensed band will monitor the RTS, CTS and the resource sharing flag.

Only when the following conditions can be met, a device B can send a resource request to device A: it can detect both RTS and CTS, it detected the resource sharing flag which shows that free resource units are available; and it did not detect transmission by other devices in same channel as reserved by device A. These conditions are to guarantee that resource sharing will not cause interference to other devices adjacent to device B.

Since there can be multiple devices requesting resources from device A, these requests can be code divisionally multiplexed, i.e. CDM'ed, and sent in a predefined resource (position) in the channel. The request can be frequency divisionally multiplexed and/or time divisionally multiplexed (FDM/TDM) in the channel with the data transmission between device A and its pair A'. The device A has to decide on allocating some resources to which requesting device, such as according to requesting devices' traffic or channel quality or even by randomly selecting one. If device A decides to allocate some free resources in the channel to device B, it will send a confirmation also in a predefined resource to device B, and to let device B know target receiver of the confirmation, the confirmation can be scrambled with a code implicitly mapped by the code used for CDM transmission of the resource request from device B.

In at least an embodiment, the resource sharing flag may be sent in one specific/predefined resource while the confirmation for allocating shared resources to a requesting device may be sent in another specific/predefined resource (different from the one used for the resource sharing flag). Nonetheless, in at least an embodiment, both specific resources could also be the same predefined resource.

Figure 2:
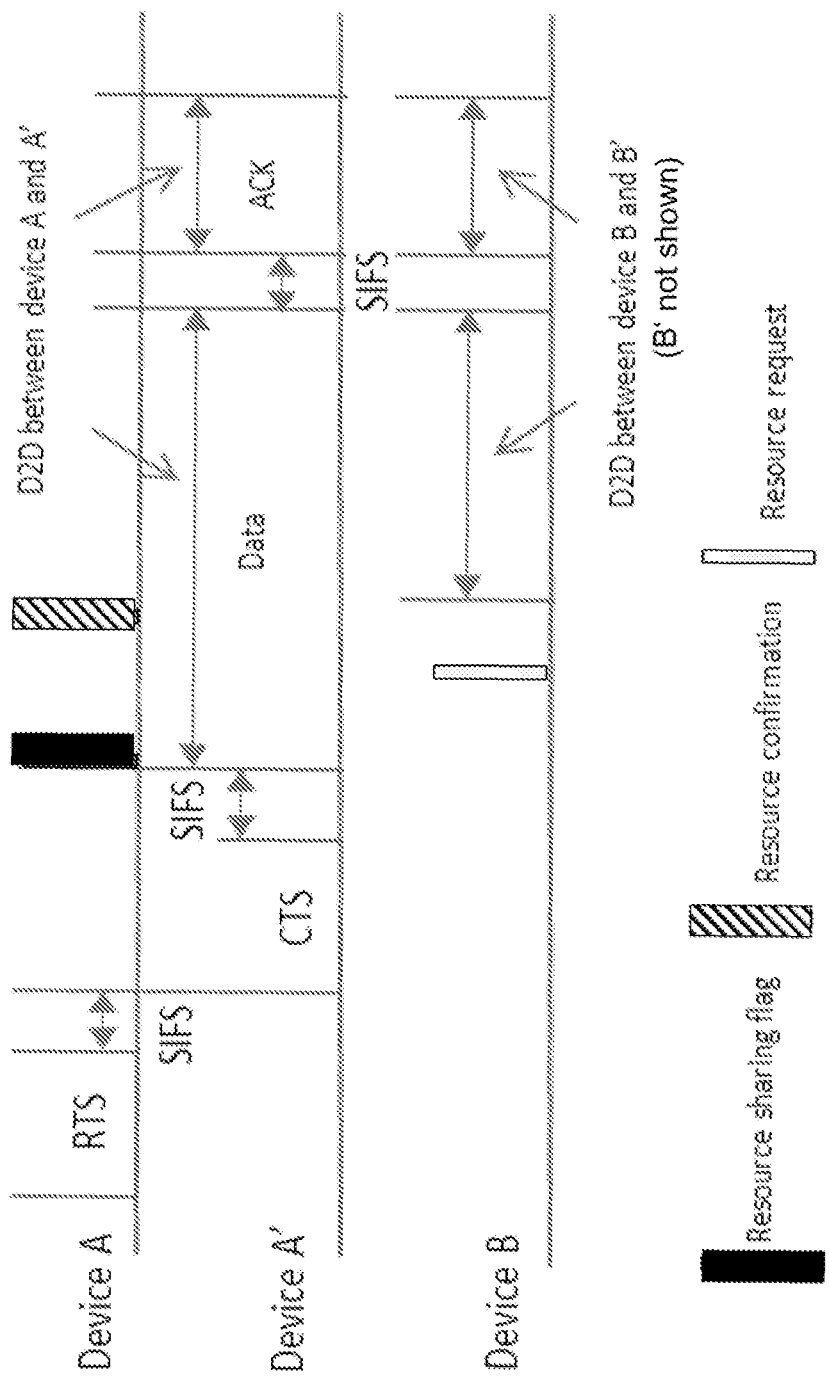
FIG. 2 illustrates an example of signaling exchange for resource sharing between involved devices according to a first and second method.

FIG. 2 illustrates an example of a signaling exchange for resource sharing between involved devices according to a first and second method.

FIG. 2 shows one example of the signaling exchange between device A and device B for resource sharing with respective paired devices A' and B' (not shown). In this example, the device A reserves the channel via RTS and the pairing device A' responds with CTS. Then both, data part and ACK part, can be utilized for D2D communication by devices A and A' for D2D communication between them. In the beginning of the D2D communication, the device A sends out the resource sharing flag, and then device B sends a request for the free resource in this channel. After detecting a resource confirmation from device A, some resource units are used by device B and the pairing device B' for D2D communication. (Note that SIFS denotes a short inter frame space, CTS a "clear to send" confirmation and RTS a "request to send" request, and that paired device B' in D2D with B is not shown in FIG. 2.)

It is to be noted that if there is a predefined time-frequency resource for the signaling, then, the time relationship between each signaling is fixed, which can reduce the detection complexity and the time between each signal should allow for the processing delay. The processing delay is expected to be much shorter than the processing delay in macro cellular between scheduling grant and data transmission due to the fact that the signal can be restricted into one symbol to reduce detection delay, and since the data is much less than that of PDSCH/PUSCH (physical downlink shared channel/physical uplink shared channel) transmission, it requires less processing time.

Moreover, as described, the request signal and confirmation signal can be configured by eNB to be used or not to be used in this resource sharing procedure. In case there is a small number of D2D devices in the cell or a local area, the collision possibility is thus low, and the eNB can configure only to use the flag signal for resource sharing (dispensing with the request and confirmation signal). This can greatly reduce the delay and make more resources shared by other devices. In case of collision, two D2D pairs will use the same resource, and performance will be bad due to interference. This can be detected by those devices, and it can randomly be decided to continue utilizing this resource or select another one.

In practice, in case there are many LTE devices in same local area, if they compete for unlicensed band simultaneously, there may be the case that the whole unlicensed band was reserved for D2D, however in each channel only part of resource was utilized. To avoid such problem, it is proposed that the device can be configured to use method I or/and method II to obtain resource for communication. In this way, it can avoid that too many devices are competing for vacant channel. And, according to the proposal, after the data transmission in the requested resource from another devices' channel, the backoff timer will not be reset, this makes it beneficial for the device to use the free resource in another devices' channel and improve the resource efficiency.

Thus, as becomes apparent from the above and stated in other words, a device (A) which successfully reserved a channel in the unlicensed band sends a resource sharing flag together with $1^{st}$ data transmission. In order to enable such sharing, there are predefined resource units per channel, and a respective D2D device pair can use 1 or multiple resource units in one channel. In one example, one resource unit can be one PRB. The resource sharing flag shows the willingness to share the channel with other devices and the resources available to other devices. The resource sharing flag is sent in a predefined position/resource of the channel, e.g. in the $1^{st}$ OFDM symbol of data part in the whole bandwidth (of the resources available to be shared).

All LTE devices that operate in D2D mode in the unlicensed band will try to monitor/detect the following signals to decide whether there is a free resource: a beacon from an access point AP; RTS, CTS, data from other stations or other LTE devices; the resource sharing flag from other LTE devices.

If a resource sharing flag is detected, the device will (optionally) send a request to the flag transmitter to ask for resource. The request is sent in a predefined resource in the channel. The requests from multiple devices are subjected to CDM, with the cyclic shift being randomly selected. The transmitter of the resource sharing flag can send a confirmation to one or more devices after detection of the resource request. The confirmation to devices can be scrambled with a random code, which is mapped implicitly to the codes used for sending request. The device who sends the request will try to detect the confirmation scrambled with corresponding code in a pre-defined time-frequency resource, and upon detection, the device can start using the confirmed resource in the channel.

As outlined before, the request and confirmation signal are optional, and can be configured by the eNB to be omitted in certain scenarios.

Other systems can benefit also from the principles presented herein as long as they have identical or similar properties like channels being subdivided into resource units such as PRBs.

Embodiments of the present invention may be implemented in software, hardware, application logic or a combination of software, hardware and application logic. The software, application logic and/or hardware generally reside on control modules of terminal devices or network devices.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

Figure 3:
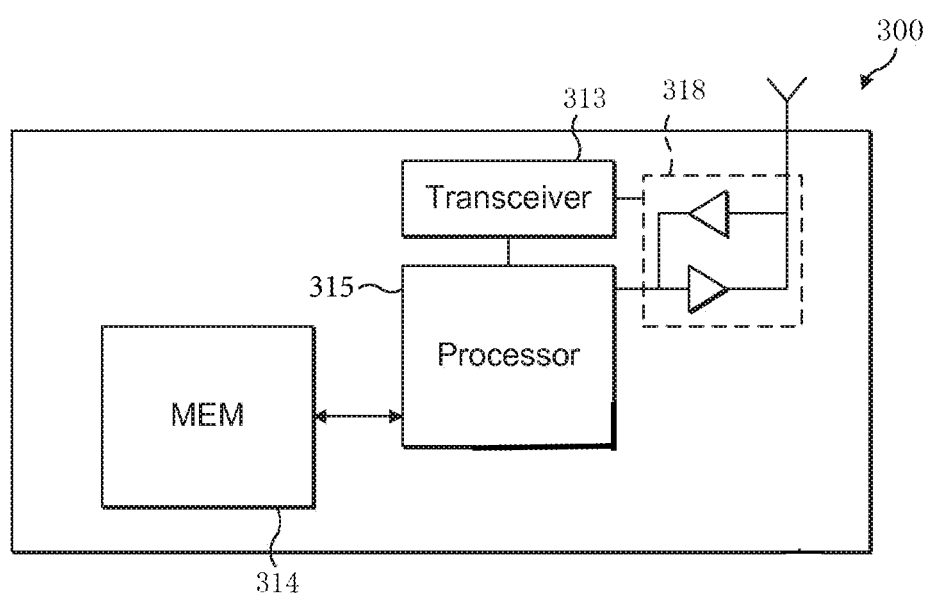
FIG. 3 illustrates a wireless apparatus in accordance with an example embodiment of the invention.

FIG. 3 illustrates an example wireless apparatus in accordance with an example embodiment of the invention. This hardware configuration is exemplary of one of device A or device B in performing the above noted process. In FIG. 3, the wireless apparatus 300 may include a processor 315, a memory 314 coupled to the processor 315, and a suitable transceiver module 313 (having a transmitter (TX) and a receiver (RX)) coupled to the processor 315, coupled to an antenna unit 318.

The processor 315 or some other form of generic central processing unit (CPU) or special-purpose processor such as digital signal processor (DSP), may operate as the control module to control the various components of the wireless apparatus 300 in accordance with embedded software or firmware stored in memory 314 or stored in memory contained within the processor 315 itself. In addition to the embedded software or firmware, the processor 315 may execute other applications or application modules stored in the memory 314 or made available via wireless network communications.

In general, the various exemplary embodiments of the wireless apparatus 300 may include, but are not limited to, part of a mobile station, an access point or a wireless device such as a portable computer having wireless communication capabilities, Internet appliances permitting wireless Internet access and browsing, as well as portable units or terminals that incorporate combinations of such functions. In one embodiment, the wireless apparatus 300 may be implemented by devices A, A' and B in FIG. 2.

The present invention relates in particular but without limitation to mobile communications, for example to environments under WCDMA, LTE, WIMAX and WLAN and/or others and can advantageously be implemented in user equipments or smart phones, or personal computers connectable to such networks. That is, it can be implemented as/in chipsets to connected devices, and/or modems thereof. More generally, various systems which allow for a dual mode operation, relying on cellular communication as one mode and a D2D mode as a second mode, may see performance improvement with the invention being implemented thereto.

If desired, the different functions discussed herein may be performed in a different order and/or concurrently with each other. Furthermore, if desired, one or more of the above-described functions may be optional or may be combined.

It is noted herein that while the above describes example embodiments of the invention, these descriptions should not be viewed in a limiting sense. Rather, there are several variations and modifications which may be made without departing from the scope of the present invention.

The present invention proposes a device, comprising a transceiver module, configured for communication on a first and at least one second band, the first band being reserved for communication using a specific communication standard, the second band being accessible for communication using different communication standards, and a control module, configured to control the transceiver module to receive and to transmit data, and to process received data. In one aspect, the control module is configured to request communication resources in the second band from another device using a first type of request to obtain access to said resources in competition with other requests of said first type issued from other devices, allocate said resources in the second band for communication upon receipt of a resource allocation confirmation from said another device, and to communicate using at least a part of the allocated resources in the second band conformant to the specific communication standard applied for communication on the first band. In another aspect, the control module is configured to detect, originating from another device, an absence of ongoing communication on a channel of the second band, a request of a first type to obtain access to said resources, and a resource allocation confirmation responsive to said request, and an indication of an unused part of resources allocated in said second band to another device, and wherein said control module is configured, responsive to the above detections, to communicate using at least a part of those indicated resources that are allocated to but unused by said another device in the second band conformant to the specific communication standard applied for communication on the first band. A corresponding network device as well as related methods and computer program products are also disclosed.

List of some acronyms used in this document:
D2D Device to Device
DL Downlink
E-UTRA Evolved Universal Terrestrial Radio Access
eNB evolved NodeB
LTE Long Term Evolution
LTE-A Long Term Evolution Advanced
PRB Physical Resource Block
Rx Reception
Tx Transmission
UE User Equipment
WS White Space

What is claimed is:
1. A device, comprising:
a transceiver module, configured for communication on a first and at least one second band, the first band being reserved for communication using a specific communication standard, the second band being accessible for communication using different communication standards; and
a control module configured to control the transceiver module to receive and to transmit data, and to process received data, wherein the control module is configured to:
request communication resources in the second band from a second device using a first type of request to obtain access to the resources in competition with other requests of the first type issued from other devices;

allocate the resources in the second band for communication upon receipt of a resource allocation confirmation from the second device;

communicate using at least a part of the resources in the second band identified in the received resource allocation confirmation, the resources used being conformant to the specific communication standard applied for communication on the first band;

determine that at least a part of the resources identified in the received resource allocation confirmation are not used by the device; and broadcast a notification to other devices indicating the unused part of the resources identified in the received resource allocation confirmation to other devices.

2. The device according to claim 1, wherein the control module is configured to compose the first type of request to obtain access to communication resources and to receive the resource allocation confirmation in a clear-to-send message compliant with a carrier sense multiple access method.

3. The device according to claim 1, wherein the allocated resources in the second band are allocated as a configured number of resource units forming a channel within the second band, and the control module is configured to communicate using at least one of the resource units.

4. The device according to claim 1, wherein the control module is configured to indicate the unused part of allocated resources by sending a corresponding indication in a predefined position in terms of bandwidth and time of the unused part of the allocated resources.

5. The device according to claim 1, wherein the control module is configured to receive a request from another device requesting allocation of the indicated unused part of the resources.

6. The device according to claim 5, wherein the control module is configured to receive the request in a predefined position in terms of bandwidth and time of the resources allocated to but unused by the device.

7. The device according to claim 5, wherein the control module is configured to transmit a confirmation to the another device so as to grant permission to the another device to use the resources.

8. The device according to claim 7, wherein the control module is configured to, in case the received request was encoded, apply a coding to the confirmation so as to allow allocation of the confirmation to a specific device that sent the request, wherein the coding applied to the confirmation is mapped to the coding used for the request.

9. A device, comprising:
a transceiver module, configured for communication on a first and at least one second band, the first band being reserved for communication using a specific communication standard, the second band being accessible for communication using different communication standards; and a control module configured to control the transceiver module to receive and to transmit data, and to process received data, wherein the control module is configured to detect, originating from another device,
an absence of ongoing communication on a channel of the second band,
a request of a first type to obtain access to the resources,
a resource allocation confirmation responsive to the request, and
an indication of an unused part of resources identified as allocated in the second band in the resource allocation confirmation, wherein the control module is configured, responsive to the above detections, to communicate using at least a part of the resources identified in the resource allocation confirmation as allocated to but unused by the another device in the second band, the resources used being conformant to the specific communication standard applied for communication on the first band.

10. The device according to claim 9, wherein the control module is further configured to, responsive to the detection of the indication of an unused part of resources allocated in the second band to another device, transmit a request to the another device requesting allocation of the indicated unused part of the resources.

11. The device according to claim 10, wherein the control module is further configured to transmit the request in a predefined position in terms of bandwidth and time of the resources allocated to but unused by the another device.

12. The device according to claim 10, wherein the control module is configured to apply a coding to the request so as to allow allocation of the request to a specific device that sent the request.

13. The device according to claim 12, wherein the control module is further configured to receive a confirmation from the another device granting permission to the device to use the resources.

14. The device according to claim 13, wherein the control module is configured to, in case the received confirmation was encoded, decode the confirmation so as to allow allocation of the confirmation to a specific device that sent the request, wherein the coding applied to the confirmation is mapped to a coding used for said request.

15. A device comprising:
a transceiver module, configured for communication on a first and at least one second band, the first band being reserved for communication using a specific communication standard, the second band being accessible for communication using different communication standards; and a control module configured to
control the transceiver module to request communication resources in the second band from a second device using a first type of request to obtain access to the resources;
allocate the resources in the second band for communication upon receipt of a resource allocation confirmation from the second device;
communicate using at least a part of the resources in the second band identified in the received resource allocation confirmation, the resources being conformant to the specific communication standard applied for communication on the first band;
determine that at least a part of resources in the second band and identified in the resource allocation confirmation are not used by the device; and
broadcast a notification to a plurality of other devices indicating that at least the part of allocated resources in the second band are not used by the device.

16. The device according to claim 15, wherein the control module is configured to compose the request for communication resources of the first type and to receive the resource allocation confirmation in a clear-to-send message compliant with a carrier sense multiple access method.

17. The device according to claim 15, wherein the allocated resources in the second band are allocated as a configured number of resource units forming a channel within the second band, and the control module is configured to communicate using at least one of the resource units.

18. The device according to claim 15, wherein the broadcast notification indicates the unused part of allocated resources to other devices.

19. The device according to claim 18, wherein the control module is configured to indicate the unused part of allocated resources by broadcasting the notification in a predefined position in terms of bandwidth and time of the unused part of the allocated resources.

* * * * *